March 7, 1967          M. L. ROSS          3,308,210
PROCESS OF MAKING PROPELLENT SUPPORTS
Filed Jan. 16, 1963
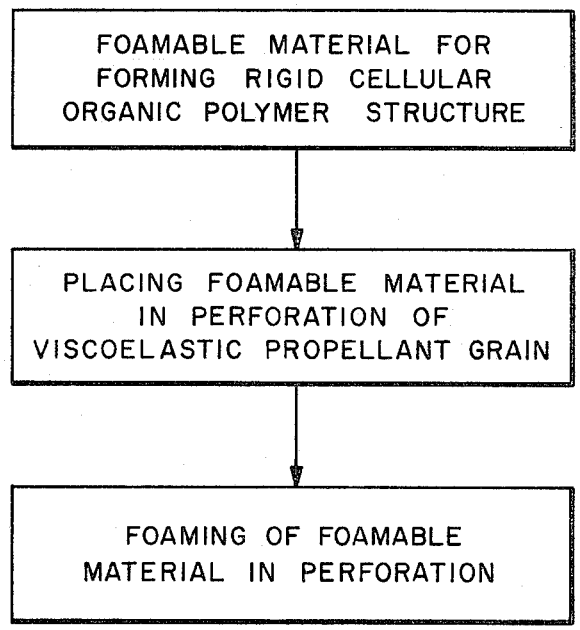
INVENTOR
MARTHA L. ROSS
BY *Emil W. Milan*
ATTORNEY

United States Patent Office 3,308,210
Patented Mar. 7, 1967

3,308,210
PROCESS OF MAKING PROPELLENT SUPPORTS
Martha L. Ross, Washington, D.C., assignor to Atlantic Research Corporation, Fairfax, Va., a corporation of Virginia
Filed Jan. 16, 1963, Ser. No. 251,753
8 Claims. (Cl. 264—3)

This invention relates to a new and improved process for providing support for an internally burning solid propellant grain. More specifically, it relates to a method of supporting the internal surfaces in the perforation of such a grain after its fabrication or its installation in a rocket motor.

In many instances, after fabrication of perforated solid propellant grains, it is necessary to store them for long periods of time. However, these grains, particularly the larger ones, if not used soon after their fabrication, have the serious disadvantage of slumping. This is caused by the viscoelastic flow of the propellant under gravitational forces over prolonged periods of time. The resulting distortion can be sufficiently great to cause serious deviations in the ballistic properties of the grain and malfunction of the rocket motor. Even if the internally burning grain is used soon after its fabrication, it may be subjected prior to ignition to accelerational and vibrational forces as, for example, in the case of sustainer rockets. These forces not only can increase viscoelastic flow, but can also produce cracks and fissures in the perforation surfaces of the grain.

The object of this invention is to provide a quick and easy process for supporting the internal surfaces of a perforated solid propellant grain.

Another object is to provide a process of foaming a support in situ in the perforation of a solid propellant grain.

A further object is to provide a method for easily and quickly foaming a support in place in the perforation of a solid propellant grain after the grain has been installed in a rocket motor.

Other objects, advantages and features of this invention will become apparent from the following detailed description and drawing.

The drawing illustrates a flow diagram of the process for internally supporting a perforated propellant grain.

Broadly speaking, my invention comprises a method for preventing slumping and for otherwise supporting the internal surfaces of a perforated solid propellant grain which comprises foaming a suitable material in place within the perforation to form a rigid, cellular, organic polymer structure. The expansion of the material as it foams ensures its penetration into the entire perforation regardless of its shape, without damage to the grain structure and results, upon setting of the foamed material, in a rigid, cellular structure which is in mating engagement with all of the surfaces of the grain perforation and acts as an unyielding support. The process is particularly advantageous in the case of slotted perforations such as star perforations and the like. Not only does the foaming composition penetrate all the crevices in such perforations, but it doese so without injuring the delicate star points or edges.

The cellular structures provide the desired support with a minimum of dead weight and without interference with ballistic performance since high temperature combustion gases produce either by ignition of a suitable igniter or the propellant grain, rapidly disintegrate and otherwise decompose the cellular structure into minute fragments or gaseous decomposition or combustion products which quickly vent out of the rocket motor.

The cellular support can also function as a seal to protect the perforation surface from the atmosphere. In such case, the expanded structure should, of course, be of the closed-cell type.

The foamed support structure can also be advantageously employed to encase and hold in position within the grain perforation suitable propellant igniters.

Although the foamed support can be any conventional chemically-inert, cellular organic polymer, in many cases it will be highly desirable that it contain an oxidizing component available to support combustion. In small quantities the oxidizing component enhances the decomposition of the cellular support. The inclusion of larger amounts additionally results in more effective ignition of the surfaces of the grain perforation.

The cellular support can comprise any organic plastic or polymeric material which can be foamed in place in a manner well-known in the foamed plastic art. Preferably, the reacting components and cured cellular structure are compatible with the composition of the propellant grain. This is not essential, however, since direct contact can be avoided by interposing a thin plastic liner, such as a film of polyethylene, polyvinyl chloride, nylon or the like between the grain surface and the foaming composition. This is readily accomplished, as for example, by inserting such a liner into the perforation in the form of a tube or bag of adequate perimeter relative to the size of the perforation, introducing the foaming material, and permitting the expansion of the latter to mate the liner with the perforation surfaces. This expedient is further advantageous in some cases to prevent bonding of the foamed plastic to the surfaces of the perforation which might inhibit ignition of the grain.

The foamable material from which my cellular support is made can be introduced into the grain perforation in any convenient manner as by pouring or spraying a mixture of reacting components into the perforation and allowing it to foam and cure. In many cases, mere mixing of the reacting components will initiate the foaming and curing reaction. However, if expedient to do so, external heat can be supplied to the reacting components in order to enhance the reaction.

The organic polymer forming the foamed structure can be one which contains a molecularly combined oxidizing element, such as oxygen, fluorine or chlorine, available for combustion of other parts of the molecule, as for example, nitrocellulose, or it can be one which requires an external oxidizing agent for combustion, such as a polyurethane polymer. Other organic polymers which can be employed for my purpose are vinyl polymers such as polyvinyl chloride, polyvinyl acetate and polystyrene, cellulose esters such as cellulose acetate; cellulose ethers such as ethyl cellulose; polyepoxies; hydrocarbon polymers such as polyethylene and polypropylene; polymerized acrylic and methacrylic acid esters and amides; urea-aldehyde and phenol-aldehyde polymers; synthetic rubber polymers such as styrene-butadiene copolymers, butadiene-acrylonitrile copolymers, neoprene, copolymers of 1,3-butadiene and 2-vinylpyridine; and the like. Particularly desirable organic materials which can be used in my process are the polyurethanes. Particularly effective for one-shot operation and because of their rigid properties are the polyurethane foams described in Stewart et al., application S.N. 813,334 of common assignee, filed May 15, 1959, now Patent No. 3,075,926. This application discloses foamed polyurethanes comprising the reaction product of a polyhydroxy alcohol ester of ricinoleic acid containing at least two ricinoleyl groups and having an equivalent weight in terms of its functional hydroxy groups above 200, such as castor oil; a second organic polyol containing at least three functional alcoholic hydroxy groups and having a maximum equivalent weight in terms of its functional hydroxy groups of about 125, such as Quadrol; an organic polyisocyanate, such as toluenediisocyanate; a polymerizable ethylenically-unsaturated monomer containing at most one reactive hydroxy group, such as styrene and diallyl phthalate; and a foaming agent.

The compositions can be processed in a variety of ways well known in the art. They can be made for example, by mixing the fully cured polymer with liquid plasticizer and other additives, such as insoluble oxidizer, and the like and then cured by heating to dissolve the plasticizer and polymer components. A technique particularly suitable for this mode of processing is the plastisol method in which the polymer, such as nitrocellulose, polyvinyl chloride, cellulose acetate, or ethyl cellulose, in the form of small, high-density spherical particles, together with other additives is dispersed in the liquid plasticizer to produce a slurry which is then heated to solution temperature.

In many cases the compositions are processed from a mixture of liquid monomers or liquid prepolymers into which the requisite additives such as oxidizer and the like are dispersed. The mixture is then cured catalytically and/or by heat. Examples of compositions particularly suited to such processing are the polyurethanes, the polyepoxies, the polymerized acrylic and methacrylic acid esters and amides, urea-aldehydes, phenol-aldehydes and the synthetic rubbers.

Any process for foaming cellular compositions in place known in the foamed plastic art can be employed, it being necessary only to select a procedure best suited to the particular polymer composition, with further care being taken to avoid curing or foaming temperatures at or close to the auto-ignition temperature of the propellant grains.

The foaming agent employed with the organic constituent can be a compound which is dispersed in the mix prior to curing and decomposed by the elevated cure or solution temperatures to form gases, such as nitrogen, carbon dioxide, and the like. Examples of such blowing agents include $\alpha,\alpha'$-azobis(isobutyronitrile); 1,1'-azobis (formamide); N,N' - dinitroso-pentamethylenetetramine; N,N'-dimethyl - N,N' - dinitrosoterephthalamide; diazoamino-benzene, p,p'-oxybis (benzenesulfonyl hydrazide); benzenesulfonylhydrazide; and the like.

Low boiling liquids such as water, ethanol, acetone, the liquid Freons, such as dichloromonofluoroethane, and the like which volatilize at the curing temperature, can also be used as blowing agents.

In accordance with still other well-known processes, the blowing agent can be a gaseous product such as $CO_2$, produced as a by-product of the curing reaction. This is exemplified by the polyurethanes. If a small amount of water or carboxylic acid is provided in the reaction mixture, some of the available isocyanate groups react with these components to produce $CO_2$.

The density, cell structure and compression strength of the foamed products can be varied and controlled in generally known fashion, as by use of different blowing agents, varying the reaction or cure temperature, varying component concentrations, the addition of foam stabilizing agents, and the like.

The foamable composition also can contain homogeneously dispersed, solid, insoluble, finely-divided oxidizers. Any insoluble solid oxidizer containing an oxidizing component, such as oxygen, fluorine, chlorine and the like, readily available for combustion, can be employed for my purpose. Such oxidizers are well known in the propellant art. They include, for example, inorganic oxidizer salts, such as the ammonium, Na, K, and Li chlorates, perchlorates, and nitrates; metal peroxides, such as sodium, K and Pb peroxide; hydrazine nitroformate; organic oxidizers, such as pentaerythritol tetranitrate, hexanitroethane, mannitol hexanitrate, and the like. The oxidizers are homogeneously dispersed in the mixture of reacting components before foaming takes place.

Conventional additives such as foam stabilizing agents and surface active dispersing agents also can be incorporated.

A particularly advantageous feature of the process is its ease and simplicity of operation. The supporting structure for the internal surfaces of a grain perforation can be formed in the perforation at any time after fabrication of the grain or even after its insertion into a rocket motor. It is merely necessary to foam a material in situ in the grain perforation until the foamed material fills the perforation completely. If desired, one end of the grain perforation can be temporarily plugged while the foaming operation is being carried out. Alternatively, the approximate amount of foam needed can be predetermined so as to use as little excess as possible. Any excess which overflows the perforation can be sliced off. If the grain perforation is to be filled with the foamed support after its installation in a rocket motor, the foamable composition can be introduced in amounts sufficient not only to fill the perforation of the grain but also other parts of the interior of the motor casing such as the portion between the aft end of the grain and the nozzle of the rocket motor. The resulting foamed organic plastic cellular material then acts not only as a support for the interior surfaces of the perforated grain but also supports the entire grain against accelerative forces.

As will be apparent to those skilled in the art, various other modifications can be carried out from the above disclosure without departing from the spirit and scope of the invention embodied within the claims.

I claim:

1. A process for internally supporting against slumping a perforated solid propellant grain comprising introducing a composition capable of being foamed into a rigid cellular organic plastic structure into the perforation of a solid propellant grain subject to viscoelastic flow under gravitational forces and foaming said composition in situ to form an expanded rigid support conforming essentially to the dimensions of said perforation.

2. The process of claim 1 in which the organic plastic is a polyurethane.

3. The process of claim 1 in which the foamable composition contains a homogeneously dispersed, finely-divided, solid, insoluble oxidizer.

4. The process of claim 3 in which the organic plastic is a polyurethane.

5. A process for supporting against slumping a perforated solid propellant grain seated inside a rocket motor comprising introducing a composition capable of being foamed into a rigid cellular organic plastic structure into said rocket motor and foaming said composition in situ to form an expanded rigid support conforming essentially to the dimensions of the perforation of said solid propellant grain and the space between the aft end of said propellant grain and the rear wall of said rocket motor said propellant grain essentially being subject to viscoelastic flow under gravitational forces.

6. The process of claim 5 in which the organic plastic is a polyurethane.

7. The process of claim 5 in which the foamable composition contains a homogeneously-dispersed, finely-divided, solid, insoluble oxidizer.

8. The process of claim 7 in which the organic plastic is a polyurethane.

References Cited by the Examiner

UNITED STATES PATENTS

| | | | |
|---|---|---|---|
| 2,845,025 | 7/1958 | Stark | 102—10 |
| 2,877,504 | 3/1959 | Fox | 264—3 |
| 2,910,730 | 11/1959 | Risch | 264—45 |
| 2,978,377 | 4/1961 | Hall et al. | 86—1 X |

(Other references on following page)

UNITED STATES PATENTS

| | | | |
|---|---|---|---|
| 2,985,055 | 5/1961 | Michael | 86—1 |
| 3,033,358 | 5/1962 | Mantell et al. | 206—46 |
| 3,045,424 | 7/1962 | Morrell | 60—35.6 X |
| 3,048,076 | 8/1962 | Capener et al. | 102—98 X |
| 3,121,993 | 2/1964 | Pennington | 60—35.6 |
| 3,128,600 | 4/1964 | Oldham | 60—35.6 |

FOREIGN PATENTS 839,078    1960   Great Britain.

BENJAMIN A. BORCHELT, *Primary Examiner.*

CARL D. QUARFORTH, SAMUEL FEINBERG,
*Examiners.*

L. D. RUTLEDGE, R. F. STAHL, *Assistant Examiners.*